United States Patent
Gu et al.

(10) Patent No.: US 10,421,903 B2
(45) Date of Patent: *Sep. 24, 2019

(54) CARRIER PARTICLE AND PREPARATION METHOD THEREOF

(71) Applicant: JOINSTAR BIOMEDICAL TECHNOLOGY CO., LTD., Hangzhou (CN)

(72) Inventors: Hongchen Gu, Shanghai (CN); Hong Xu, Shanghai (CN); Dingshengzi Zhang, Shanghai (CN); Ying Zhu, Shanghai (CN); Yefei Wang, Shanghai (CN)

(73) Assignee: Joinstar Biomedical Technology Co., Ltd., Hangzhou (CN)

( * ) Notice: Subject to any disclaimer, the term of this patent is extended or adjusted under 35 U.S.C. 154(b) by 301 days.

This patent is subject to a terminal disclaimer.

(21) Appl. No.: 15/316,131

(22) PCT Filed: Aug. 5, 2015

(86) PCT No.: PCT/CN2015/086144
§ 371 (c)(1),
(2) Date: Dec. 2, 2016

(87) PCT Pub. No.: WO2015/185023
PCT Pub. Date: Dec. 10, 2015

(65) Prior Publication Data
US 2017/0121603 A1     May 4, 2017

(30) Foreign Application Priority Data

Jun. 5, 2014 (CN) .......................... 2014 1 0247053

(51) Int. Cl.
| C09K 11/88 | (2006.01) |
| B82Y 20/00 | (2011.01) |
| B82Y 25/00 | (2011.01) |
| B82Y 30/00 | (2011.01) |
| B82Y 40/00 | (2011.01) |
| C09K 11/02 | (2006.01) |
| C09K 11/06 | (2006.01) |

(52) U.S. Cl.
CPC ............ *C09K 11/883* (2013.01); *B82Y 20/00* (2013.01); *B82Y 25/00* (2013.01); *B82Y 30/00* (2013.01); *B82Y 40/00* (2013.01); *C09K 11/02* (2013.01); *C09K 11/025* (2013.01); *C09K 11/06* (2013.01); *C09K 11/88* (2013.01); *Y10S 977/774* (2013.01); *Y10S 977/892* (2013.01); *Y10S 977/95* (2013.01)

(58) Field of Classification Search
CPC ..... C09K 11/883; C09K 11/02; C09K 11/025; B82Y 25/00; B82Y 20/00; B82Y 30/00; Y10S 977/779; Y10S 977/783; Y10S 977/95
See application file for complete search history.

(56) References Cited

U.S. PATENT DOCUMENTS

2008/0230750 A1* 9/2008 Gillies .................. B82Y 30/00
252/500

FOREIGN PATENT DOCUMENTS

| CN | 101216415 A | 7/2008 |
| CN | 101953975 A | 1/2011 |
| CN | 102266740 A | 12/2011 |
| CN | 102416180 A | 4/2012 |
| CN | 102863963 A | 1/2013 |
| CN | 103134926 A | 6/2013 |
| CN | 103571493 A | 2/2014 |
| CN | 103881701 A | 6/2014 |
| KR | 20110133405 A | 12/2011 |
| WO | 2012/153820 A1 | 11/2012 |
| WO | 2013/001685 A1 | 1/2013 |

OTHER PUBLICATIONS

International Search Report (English Translation) dated Nov. 12, 2015 in PCT/CN2015/086144, 3 pages.
Stöber, W., et al., "Controlled Growth of Monodisperse Silica Spheres in the Micron Size Range," Journal of Colloid and Interface Science, 1968, vol. 26, pp. 62-69.
Li, Juan, et al., "Quantum-dot-coated encoded silica colloidal crystals beads for multiplex coding," Chem. Commun., 2009, pp. 2329-2331.
Li, Yun-Hong, et al., "An efficient method for preparing high-performance multifunctional polymer beads simultaneously incorporated with magnetic nanoparticles and quantum dots," J. Mater. Chem, 2011, vol. 21, pp. 12520-12528.
Graf, Christina, et al., "A General Method for the Controlled Embedding of Nanoparticles in Silica Colloids," Langmuir, 2006, vol. 22, pp. 5604-5610.
Smith, Andrew, et al., "Minimizing the Hydrodynamic Size of Quantum Dots with Multifunctional Multidentate Polymer Ligands," J. Am. Chem. Soc., 2008, vol. 130, pp. 11278-11279.

* cited by examiner

*Primary Examiner* — C Melissa Koslow
(74) *Attorney, Agent, or Firm* — Kilpatrick Townsend & Stockton LLP

(57) ABSTRACT

Disclosed is a carrier particle, comprising a sphere and a sub-sphere on the surface of the sphere; the sphere and/or at least one sub-sphere comprise at least one type of quantum dots. Also disclosed is a method for preparing the carrier particle, mainly by connecting at least one nanosphere to a microsphere, and the microsphere and/or the nanosphere are loaded with at least one type of quantum dots.

20 Claims, 1 Drawing Sheet

CARRIER PARTICLE AND PREPARATION METHOD THEREOF

CROSS-REFERENCE TO RELATED APPLICATIONS

This application is a national phase application under 35 U.S.C. 371 claiming priority to PCT/CN2015/086144, filed Aug. 5, 2015, which application claims priority to CN 201410247053.3, filed Jun. 5, 2014, the teachings of which are hereby incorporated by reference in their entireties for all purposes.

TECHNICAL FIELD

The present invention relates to the field of biological detection, in particular, relates to a carrier particle using assembled microspheres in combination of quantum dots encoding.

BACKGROUND

In the field of current biological detection, microspheres have been widely used as a solid carrier in vitro diagnosis to identify, capture, control and transport target molecules to be tested. On this basis, a further goal of research and experiment is to achieve multiplex detection, i.e. various target molecules to be tested can be detected simultaneously in one detection, and to add detection items in multiplex detection. Therefore, microspheres carrying different specific ligands should be marked, i.e. the microspheres should be encoded so that they can be identified according to the marker thereon during the detection.

An early encoding mode is adding an organic fluorescent dye in microspheres. The fluorescent dye will have specific fluorescence emission spectrum, including intensity and emission wavelength of the fluorescence, when excited by a laser at a specific wavelength. When different organic fluorescent dyes are used, different fluorescence emission spectrums can be obtained after excitation, thereby identifying the microspheres. However, following disadvantages exist when organic fluorescent dyes are used.

(1) It is difficult to select an organic dye, because the Stocks shift of the organic dye itself is relatively small and every dye has its best excitation wavelength, in order to reach their optimum fluorescence emission intensity, usually it is needed to use lasers with different excitation wavelengths, which makes that a testing equipment must be equipped with multiple lasers and it is difficult to achieve miniaturization of the detection equipment.

(2) The stability of organic dyes is relatively poor, and it is prone to photobleaching or photoquenching. Once above phenomena occurs, the fluorescence intensity or the fluorescence emission wavelength will change, thus affecting the encoding precision and accuracy degree.

(3) The emission spectrum of organic dyes is wide and asymmetrical. When two kinds of organic dyes having different emission spectrum are hybrid encoded, the fluorescence emission spectrum are easily to be superimposed on each other, which makes that the encoding ability is low and they are easy to interfere with each other.

Quantum dot, also known as semiconductor nanocrystal, is stable nanocrystal particle with a size of 1-100 nm consisted of elements selected from group IIB/VIA (such as CdSe, etc.) or group IIIA/VA (such as InP, GaAs, etc.). It can accept laser excitation and produce fluorescence. The special structure makes it have unique optical properties which are unmatched for ordinary fluorescence material. There has achieved some breakthrough progress in its application in biological sciences, and related technologies by using quantum dots instead of organic fluorescent dyes to encode microspheres have been developed. Compared with organic fluorescent dyes, quantum dot has following advantages:

(1) The quantum dot has very wide Stocks displacement, and emission spectrum of quantum dots with different particle size is different from each other. The larger the particle size of the quantum dot is, the greater its emission wavelength is. Therefore, by regulating the particle size of the quantum dot, spectrum with different fluorescence colors can be emitted when quantum dots with different particle sizes are excited by using same laser.

(2) The quantum dot has high and stable fluorescence quantum yield, and photobleaching or photo-quenching effect is relatively weak, so the prepared encoded microsphere is less prone to cross color or garbled code.

(3) The emission spectrum of the quantum dot is narrow and symmetrical, compared with organic fluorescent dyes, its encoding ability is stronger and less prone to be interfered.

Although the microspheres encoded with quantum dots have provided specific ligand carrier which is easier to identify for multiplex detection, due to the inherent differences among various detection items in multiplex detection, it is difficult to make all of detection items in their optimal reaction conditions during multiplex detection, which inevitably cause differences in sensitivity among different detection items. Meanwhile, the non-specific adsorption of each probe molecule will also cause a certain degree of detection error.

The latest study has found that, compared with single microspheres having smooth surface, assembled microspheres having topology formed by connecting nano-sized microspheres to the surface of micron-sized or submicron-sized microspheres, as a solid carrier in biological detection, can significantly improve the detection sensitivity and reduce non-specific adsorption. Therefore, the assembled microspheres are more suitable for multiplex detection. Related arts of assembled microspheres may refer to Chinese Application CN103134926A.

In the field of biology, both quantum dot encoding and assembled microspheres are all advanced technology, and currently there is no related technology on assembled microspheres encoded with quantum dots formed by combining the above two and preparation thereof. Meanwhile, it can be forecasted that, on the premise that the types of quantum dots that can be employed are certain, compared with the single microspheres, encoding assembled microspheres can generate more encoding amount or types of identifiable carrier, which also provides necessary conditions for adding detection items in multiplex detection.

Therefore, the skilled in the art devote themselves to develop an assembled microsphere encoded with quantum dots which is more suitable for multiplex detection in bioassay and preparation method thereof.

SUMMARY OF INVENTION

In order to achieve above object, the present invention has provided a carrier particle based on quantum dot encoding and assembled microspheres which comprises a sphere and a sub-sphere located on the surface of the sphere; the sphere and/or at least one sub-sphere comprises at least one type of quantum dots.

Further, the type of quantum dots in the sphere is different from that in the sub-sphere.

Further, the surface of the sphere is coated with the sub-sphere.

Further, the sub-sphere comprises a nanosphere as the main structure, and the quantum dots are loaded on the surface or in the interior of the nanosphere.

Further, at least one layer of quantum dots is coated on the surface of the nanosphere, which means the quantum dots can be assembled layer by layer on the surface of the nanosphere.

Further, the types of quantum dots located in one layer are identical or not identical, and the types of quantum dots located in different layers are identical or not identical.

Further, the nanosphere is a spherical structure with a particle diameter of 30~500 nm.

Further, the nanosphere is made of polymer or silica.

Further, the polymer is one selected from the group consisting of polystyrene, copolymer of polystyrene and polyacrylic acid, copolymer of polystyrene and polymethacrylic acid, and copolymer of polystyrene and divinylbenzene.

Further, the sphere comprises a microsphere as the main structure, and the quantum dots are loaded in the interior or on the surface of the microsphere.

Further, the microsphere is a spherical structure with a particle diameter of 0.5~20 µm.

Further, the microsphere is made of polymer or silica.

Further, the polymer is one selected from the group consisting of polystyrene, copolymer of polystyrene and polyacrylic acid, copolymer of polystyrene and polymethacrylic acid, and copolymer of polystyrene and divinylbenzene.

Further, the surface of both the sphere and the sub-sphere are modified by functional groups, and the connection between the sphere and the sub-sphere is achieved by chemical covalent reactions between the functional groups.

Further, the functional group is one selected from the group consisting of amino, carboxyl, hydrosulphonyl, and hydroxyl.

Further, the type of the quantum dots is defined according to a central wavelength of the fluorescence emission spectrum of the quantum dots (hereinafter referred as a central emission wavelength), namely the type of the quantum dots is distinguished only by their central emission wavelength.

Further, two or more types of quantum dots are used.

Further, the absolute value of the difference between the central wavelengths of adjacent fluorescence emission spectrums of two or more types of quantum dots are larger than or equal to 30 nm, namely each interval between the central wavelengths of the fluorescence emission spectrum of various types of quantum dots is larger than or equal to 30 nm.

Further, the quantum dot may be any one of nanoparticles consisted of group II-VI elements or group III-V elements, and a preferred quantum dot of the present invention is CdSe@ZnS.

Further, the sphere and/or the sub-sphere comprise magnetic nanoparticles, i.e. both the sphere and the sub-sphere are magnetic, or one of the sphere and the sub-sphere is magnetic.

Further, the magnetic nanoparticle can be any one of magnetic metal particles including iron, cobalt, nickel, and ferrite. A preferred magnetic nanoparticle of the present invention is an iron oxide nanoparticle.

Further, at least one sub-sphere comprises organic fluorescent dye, namely a sub-sphere marked by fluorescent dye can be used at the same time.

Further, the absolute value of the difference between the central wavelength of the fluorescence emission spectrum of the organic fluorescent dye and the central wavelength of the fluorescence emission spectrum of the quantum dot loaded onto the sphere is greater than or equal to 50 nm. A preferred organic fluorescent dye of the present invention is fluorescein isothiocyanate.

The present invention also has provided a method for preparing the carrier particle, namely at least one nanosphere is linked to the microsphere, and the microsphere and/or the nanosphere are loaded with at least one type of quantum dots.

Further, the method comprises the following steps:

(1) loading quantum dots onto the microsphere, thus forming a fluorescent microsphere; and/or (2) loading quantum dots onto the nanosphere, thus forming a fluorescent nanosphere; and (3) connecting the fluorescent microsphere with the fluorescent nanosphere, or connecting the microsphere with the fluorescent nanosphere, or connecting the fluorescent microsphere with the nanosphere, thus forming the carrier particle;

wherein step (1) and step (2) are in no particular order when both steps are performed.

Further, the fluorescent microsphere comprises at least one type of quantum dots, and various types of fluorescent microspheres are defined according to the type of the quantum dots respectively; the fluorescent nanosphere comprises at least one type of quantum dots, and various types of dyed nanospheres are defined according to the type of the quantum dots respectively.

In the examples of the present invention, microspheres and various types of dyed microspheres are defined as different types of spheres, and nanospheres and various types of fluorescent nanospheres are defined as different types of sub-spheres, and the carrier particles encoded differently are formed by combination of various types of spheres and sub-spheres with each other.

Further, fluorescent microspheres with various fluorescence levels are defined according to the number of quantum dots loaded onto the same type of fluorescent microspheres; fluorescent nanospheres with various fluorescence levels are defined according to the number of quantum dots loaded onto the same type of fluorescent nanospheres.

Further, the dyed microsphere in step (3) is of any type.

Further, the fluorescent nanosphere in step (3) is of any one or more of types, namely single type or various types of fluorescent nanospheres can be connected to microspheres or fluorescent microspheres, depending on the encoding amount required.

Further, step (3) may comprise replacing part of the fluorescent nanospheres with the nanospheres and simultaneously connecting the nanospheres and the fluorescent nanospheres on the surfaces of the microspheres or the fluorescent microspheres, wherein the total amount of quantum dots loaded onto the fluorescent nanospheres in the carrier particles can be regulated by the ratio of the two.

Further, the method of connecting in step (3) is that the connecting is achieved through the chemical covalent reaction between functional groups which is respectively linked on the surfaces of microspheres, fluorescent microspheres, nanospheres and fluorescent nanospheres.

Further, the functional group is one selected from the group consisting of amino, carboxyl, hydrosulphonyl, and hydroxyl.

Further, the loading position of quantum dots is on the surface or in the interior of the microspheres.

Further, the loading position of quantum dots is on the surface or in the interior of the nanospheres.

Further, the surface of the nanospheres loaded with quantum dots is coated with at least one layer of quantum dots.

Further, the types of quantum dots located in one layer are identical, and the types of quantum dots located in different layers are identical or not identical.

Further, the types of quantum dots located in one layer are not identical.

Further, microspheres and nanospheres are made of polymer or silica.

Further, the polymer is one selected from the group consisting of polystyrene, copolymer of polystyrene and polyacrylic acid, copolymer of polystyrene and polymethacrylic acid, and copolymer of polystyrene and divinylbenzene.

Further, the microsphere and the nanosphere are a spherical structure with a particle diameter of 0.5~20 µm and 30~500 nm respectively.

Further, the type of the quantum dots is defined according to a central wavelength of the fluorescence emission spectrum of the quantum dots, namely the type of the quantum dots is distinguished only by their central emission wavelength. The above fluorescent microspheres and fluorescent nanospheres can be loaded with quantum dots having one or more central emission wavelengths, thereby expanding the encoding amount; at the same time, the fluorescent intensity of the quantum dots having same central emission wavelength may also be adjusted by regulating the amount of quantum dots, thereby further expanding the encoding amount. The above fluorescence level characterizes the fluorescence intensity produced by quantum dot having one central emission wavelength, or the combination of the fluorescence intensity produced by quantum dots having one more central emission wavelength, in one fluorescent microsphere or one fluorescent nanosphere.

Further, two or more types of quantum dots are used.

Further, the absolute value of the difference between the central wavelengths of adjacent fluorescence emission spectrum of two or more types of quantum dots are larger than or equal to 30 nm, namely each interval between the central wavelengths of the fluorescence emission spectrum of various types of quantum dots is larger than or equal to 30 nm.

In a preferred embodiment of the present invention, the central wavelengths of the fluorescence emission spectrum of two types of quantum dots are 520 nm and 600 nm respectively.

Further, the quantum dot may be any one of nanoparticles consisted of group II-VI elements or group III-V elements, and a preferred quantum dot of the present invention is CdSe@ZnS. Further, the microsphere and/or the nanosphere comprise a magnetic nanoparticle, i.e. both the sphere and the sub-sphere are magnetic, or one of the sphere and the sub-sphere is magnetic.

Further, the magnetic nanoparticle can be any one of magnetic metal particles including iron, cobalt, nickel, and ferrite. A preferred magnetic nanoparticle of the present invention is an iron oxide nanoparticle.

Further, at least one nanosphere is loaded with organic fluorescent dye, namely a sub-sphere marked by fluorescent dye can be used at the same time.

Further, the absolute value of the difference between the central wavelength of the fluorescence emission spectrum of the fluorescent dye and the central wavelength of the fluorescence emission spectrum of the quantum dot loaded onto the microsphere is greater than or equal to 50 nm. A preferred fluorescent dye of the present invention is fluorescein isothiocyanate.

Assembled microspheres and quantum dot encoding are combined in the present invention. A assembled microsphere has higher sensitivity than a non-assembled microsphere in bioassay, which makes it more suitable for multiplex detection. Being encoded by quantum dots provides necessary conditions for multiplex detection. Meanwhile, the combination of the two also has following beneficial effect:

Firstly, the advantages of the self-structure of assembled microspheres can realize the loading of the quantum dots in the sphere and the sub-sphere respectively or simultaneously, compared with the non-assembled microspheres, the ability to load quantum dots is significantly improved. When loaded with various types of quantum dots, the assembled microspheres can fully exert the advantages of a double physical space and realize a reasonable distribution of various types of quantum dots on the sphere and the sub-sphere. The upper limit for loading density of each type of quantum dots increases exponentially than that of the non-assembled microspheres, so combination of a large number of microspheres having different fluorescent intensity can be realized, which greatly improve the encoding ability of fluorescent carrier microspheres.

Secondly, the preparation of encoded microspheres can be achieved by modular assembling of the spheres and the sub-spheres. During the preparation, only a certain number of spheres and sub-spheres loaded with quantum dots having different central emission wavelengths and different fluorescence intensities need to be prepared, and then the spheres and the sub-spheres are combined flexibly to obtain a large number of assembled encoded microspheres. Since only a few types of the spheres and the sub-spheres need to be prepared, and the assembling process is relatively simple, and is of high stability and good reproducibility, and is easy to control, so the stability in preparing different batches of encoded microspheres is good.

Thirdly, combined with the advantages of the emission spectrum of quantum dots, loading different types of quantum dots onto the sphere and the sub-sphere respectively reduce the probability of mutual interference of fluorescence spectrum and transfer of fluorescence energy when different types of quantum dots are loaded in one microsphere, which makes the resolution of the encoded assembled microspheres higher.

The following examples further illustrate the concept, specific structure and technical effect of the present invention, so that the objects, features and effects of the present invention may be fully understood.

DETAILED DESCRIPTION OF INVENTION

Figure 1:
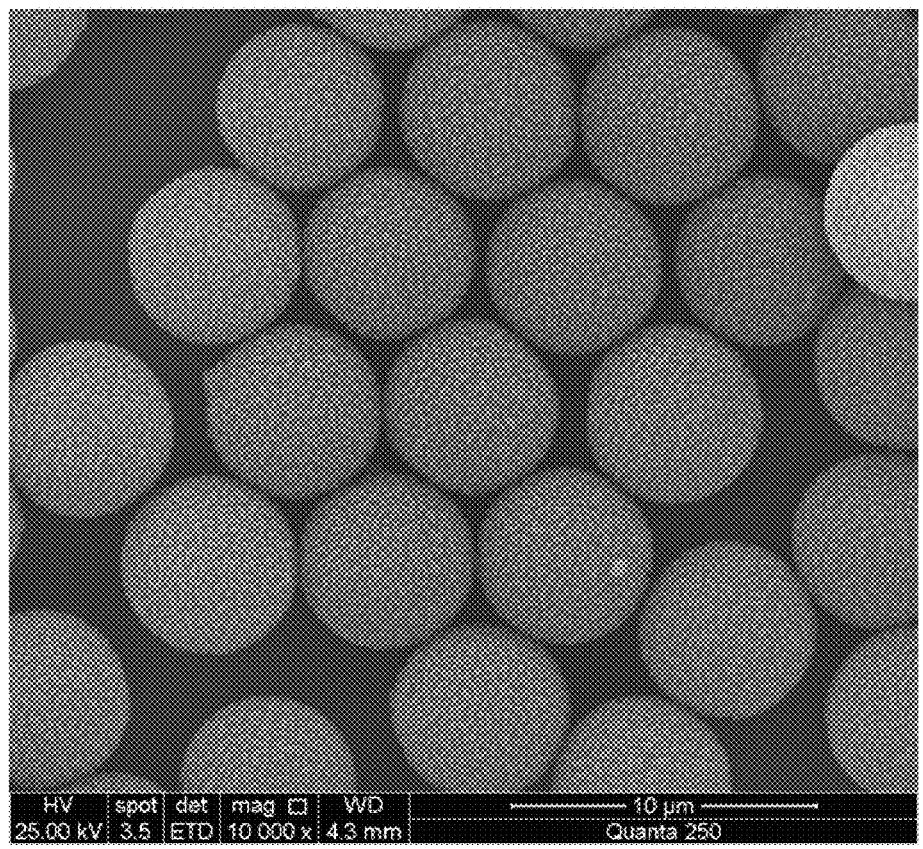
FIG. 1 is a SEM photograph of a carrier particle of the present invention.

The carrier particles of the present invention are mainly prepared by two structural units, the sphere and the sub-sphere, which are assembled microspheres of a raspberry-like structure and finally formed through chemical covalent reactions between the functional groups on the surface of the sphere and the sub-sphere, as shown in FIG. 1, and the preparation of the sphere and the sub-sphere structural units are respectively described as follows (in the following examples, quantum dots having two central emission wavelengths are used, however, following the method and encoding conception described as below, two or more kinds of quantum dots with an absolute value of the difference of the central emission wavelength of the quantum dots not lower than 30 nm, or one type of quantum dots loaded in the internal or on the surface of the spheres and one kind of organic fluorescent dyes with a difference between their fluorescence central emission wavelength and that of the quantum dots loaded on the sphere not less than 50 nm loaded in the internal of the sub-sphere can be used):

First, the sphere structural unit and the preparation thereof.

Type One:

Polymeric non-fluorescent microsphere. The sphere can be a polymeric microsphere with a particle diameter of 0.5~20 μm, preferably 5~6 μm, and the microsphere has active functional groups on the surface, and the most preferred functional group is carboxyl. The most preferred polymeric microspheres are those loaded with magnetic nanoparticles in their internal.

Type Two:

Polymeric mesoporous microspheres loaded in their internal with fluorescent quantum dots having a central emission wavelength of 520 nm. The polymeric mesoporous sphere can be a polystyrene-divinylbenzene (PS-DVB) copolymerized mesoporous microsphere having a pore size of 10 nm~70 nm, and the particle size of the microsphere is 5~6 μm. At the central position of the emission spectrum of the quantum dots loaded in the interior of the polymeric mesoporous microspheres is green fluorescence of 520 nm, and the fluorescence emission intensity can be adjusted by regulating the concentration of quantum dots loaded, and finally a number of encoded microspheres spheres having completely independent fluorescence intensity levels are formed when detected by a flow cytometer.

The basic method for preparing such encoded microspheres spheres are as follows:

Step one: weighing 3 mg of PS-DVB mesoporous microspheres having a pore size of 30 nm, pouring them into a 25 mL beaker, then 9.5 mL of n-butanol is added into glass bottle and the obtained is ultrasonically dispersed. 500 μL of a hydrophobic CdSe@ZnS quantum dot dispersion in chloroform at a concentration of 7.2 μM having an emission wavelength of about 520 nm and a particle diameter of 2.4~2.6 nm is added into the n-butanol dispersion, the obtained is reacted under vortex for 15 minutes. After completion of the reaction, the reaction solution is immediately centrifuged at 10,000 rpm for 15 minutes, and the supernatant is discarded. The particles are then redispersed in 1 mL of ethanol, dispersed under vortex and washed with ethanol for 3 times. Finally, the particles are dispersed in 200 μl of ethanol to obtain QDs@PS-DVB polymer sphere.

Step two: in a three-necked flask, 3 mg of QDs-loaded mesoporous microspheres obtained in the above step are dispersed in 3.3 mL of a mixed solution of ethanol/water (95:5), to which 20 μl of tetraethoxysilane is added with stirring, and stirred for another 0.5h, then 60 μl of ammonia is added and stirred for a further 24 hours. The microspheres are washed for three times with ethanol by centrifugal separation and then dispersed in ethanol to give QDs@PS@silica microspheres having green fluorescence with a main emission peak at 520 nm.

Step three: 4 mg of QDs@PS@silica microspheres obtained in the above step two are dispersed in 630 μl of a mixed solution of alcohol/water (95:5), to which 50 μl of methacryloxy propyl trimethoxyl silane (MPS) is added with stirring, and stirred for another 0.5h, then 150 μl of ammonia is added adjusting pH of the reaction system to ≈8.0. The reaction is mechanically stirred at room temperature for 10 hours, then the obtained is washed for three times with alcohol using a centrifugal separation method to remove excess modifiers and catalysts, and then freeze-dried to give modified QDs@PS@silica@MPS microspheres.

Step four: the MPS-modified QDs@PS@silica@MPS microspheres are ultrasonically dispersed in 0.5 mL of St monomer, shaked for 15 minutes, then added dropwise into 20 mL of aqueous solution dissolving 0.1% of sodium dodecyl sulfate (SDS) with ultrasonication at 50 W. The formed emulsion is magnetically stirred at room temperature with a flow of nitrogen for 30 minutes, 5 mg of potassium persulfate as a initiator dissolved in a small amount of water is added, and then the reactor is moved into a water bath at 70° C. The reaction is started and timed with a flow of nitrogen for another 30 minutes, then a condensing reflux device is equipped, and the reaction is mechanically stirred at 200 rpm. After being polymerized for 2.5 hours, 0.5 mL of acrylic monomer is added into the reaction system, the reaction is continued at 70° C. for hours and cooled at room temperature with stirring to obtain QDs@PS@silica@MPS@PS-PAA microspheres of which the surface is modified by carboxyl.

In step one, adjusting the concentration of the quantum dot in chloroform added, then QDs@PS@silica@MPS@PS-PAA encoded spheres having a variety of fluorescence intensity can be respectively obtained.

In step three and four, it is not limited to prepare QDs@PS@silica@MPS@PS-PAA encoded microspheres by firstly performing surface-grafted modification using MPS and then acrylic acid polymerization. The surface of QDs@PS@silica microspheres obtained in step two can also be graft-modified with aminopropyltrimethoxysilane (APTMS) or aminopropyltriethoxysilane (APTES) to give QDs@PS@silica@APS, of which the surface is then chemical grafted with polyacrylic acid polymer, and the QDs@PS@silica@APTMS@PS-PAA encoded spheres with a variety of fluorescence intensity is obtained.

Type Three:

Polymeric mesoporous microspheres loaded with fluorescence quantum dots having a central emission wavelength of 600 nm in their interior. The polymeric sphere can be polystyrene-divinylbenzene (PS-DVB) copolymerized mesoporous microspheres having a pore size of 10 nm~70 nm, and the particle size of microspheres can be 5~6 μm. At the central position of the emission spectrum of the quantum dots loaded in the interior of the polymeric mesoporous microspheres is red fluorescence of 600 nm, and the fluorescence emission intensity can be adjusted by regulating the concentration of quantum dots loaded, and finally a number of encoded microspheres spheres having completely independent fluorescence intensity levels are formed when detected by a flow cytometer.

The basic method for preparing such encoded microspheres spheres is consistent with the method for preparing microspheres of type two, except that the quantum dots added in the interior of the mesoporous polymeric microspheres are red quantum dots whose central position of the emission spectrum is 600 nm, such as CdSe@ZnS nanocrystals with a central emission wavelength of 600 nm and a particle size of 4.7~5.2 nm.

Similarly, a number of encoded microspheres having completely independent fluorescence intensity can be obtained by adjusting the concentration of the quantum dot dispersion in chloroform added in step one.

Type Four:

Polymeric mesoporous microspheres in the interior loaded with two kinds of quantum dots having a central emission wavelength of 520 nm and 600 nm respectively. The polymeric sphere can be polystyrene-divinylbenzene (PS-DVB) copolymerized mesoporous microspheres having a pore size of 10~70 nm, and the particle size of microspheres can be 5~6 μm. The amount of the two kinds of quantum dots (such as CdSe@ZnS nanocrystals with a particle size of about 2.5 nm and 5.0 nm respectively) loaded in the interior of the polymeric mesoporous microspheres can be adjusted by regulating the concentration of quantum dots loaded, and a number of completely independent fluorescence intensity levels can be formed in the two kinds of fluorescence emission spectrum when detected in the flow cytometer.

Type Five:

Polymeric mesoporous microspheres loaded with quantum dots on the surface. The preparation method can refer to the method for preparing a sub-sphere in type two.

The above polymeric microspheres material for preparing the sphere may also be one selected from the group consisting of polystyrene, copolymer of polystyrene and polyacrylic acid, and copolymer of polystyrene and polymethacrylic acid, and the functional group may also be one selected from the group consisting of hydrosulphonyl and hydroxyl.

Second, the sub-sphere structural unit and preparation thereof.

Type One:

Non-fluorescent silica or polymer nanospheres modified by amino or carboxyl on the surface. The nanospheres have a particle size of 30~500 nm, and most preferably 200 nm.

Type Two:

Silica nanospheres loaded with fluorescence quantum dots having a central emission wavelength of 520 nm on the surface. The optimal particle size of silica nanospheres is 200 nm, and the surface of the silica nanospheres are modified with functional groups, preferably amino or carboxyl, and the quantum dots assembled on the surface of the silica nanospheres can be CdSe@ZnS nanocrystals with a particle size of 2.4~2.6 nm. The basic preparation method for the sub-spheres of type two is as follows:

Step one: hydrophilic quantum dots modified by carboxyl on the surface having a central emission wavelength of about 520 nm, such as CdSe@ZnS nanocrystals or other quantum dots crystal emitting fluorescence at the same wavelength, are prepared by referring to references [Nie, JACS, 2008, 130, 11278~11279].

Step two: silica particles of 200 nm are prepared by stobe method [Werner Stöber, Journal of Colloid and Interface Science, 1968: P 62-69], and then silica particles modified by alternately assembling polyanionic electrolytes and polycationic electrolytes on the surface and with a positive charge (Silica@PE3) are prepared by the layer by layer self assembling method [Gu, Chem Commun., 2009, 2329-2331], and then CdSe@ZnS quantum dots surface modified by carboxyl obtained in step one are assembled to the surface of Silica@PE3 through electrostatic adsorption to give Silica@PE3@QDs sub-sphere emitting fluorescence at 520 nm. The specific preparation method is as follows (the whole preparation process is conducted in the dark):

Firstly, a dispersion of 11 mg of silica particles (the particle size is 200 nm) in ethanol is centrifuged to remove the supernatant. Then 200 μL of ultrapure water is added and the obtained is ultrasonic dispersed and centrifuged to remove the supernatant, and the silica particles are redispersed in 3.6 mL of polycationic electrolytes (PDADMAC) solution (2 mg/mL), mixed and adsorbed for 20 minutes, and centrifuged to remove the supernatant. The solid particles obtained by centrifugation are redispersed in 1 mL of ultrapure water and washed with water for three times to obtain Silica@PDADMAC solid particles, which are dispersed in 4 mL of ultrapure water. Next the deposition process of two layers (polyanionic electrolyte PSS and polycationic electrolyte PDADMAC) is completely identical to that of PDADMAC, and Silica@PDADMAC@PSS@PDADMAC(Silica@PE3) solid particles were finally obtained. The solid particles are dispersed in 2 mL of ultrapure water for use. Then, 1 mL of aqueous dispersion of above Silica@PE3 particles is centrifuged to remove the supernatant, and then 1 mL of 50 mM sodium chloride aqueous solution is added, and the obtained is ultrasonically dispersed and centrifuged to remove the supernatant, the obtained solid particles are redispersed in 450 μL of 50 mM of sodium chloride aqueous solution, meanwhile 50 μL of quantum dots (the concentration is 8 μM) modified by carboxyl on the surface obtained in Step one is added, the obtained is mixed and adsorbed for 2 hours. After adsorption, the mixed solution is centrifuged to remove the supernatant, the solid particles obtained by centrifugation are redispersed in 1 mL of ultrapure water and washed with water for three times. The solid particles obtained by centrifugation are Silica@PE3@QDs fluorescent particles with a central emission wavelength of 520 nm. The fluorescent silica particles are dispersed in 1 mL of ultrapure water for use. Finally, 1 mL of sodium silicate aqueous solution (2.58 mg/mL, pH 11.9) and 1 mL of ultrapure water are added into the dispersion of the above prepared Silica@PE3@QDs fluorescent particles to coat the surface with silica shell layer, which is reacted at 25° C. for 48h, the obtained is centrifuged to remove the supernatant. The solid particles (Silica@PE3@QDs@Silica) obtained by centrifugation are redispersed in 1 mL of to ultrapure water and washed with water for three times and ethanol once, and finally the solid particles are dispersed in 1 mL of ethanol. 5 μL of γ-aminopropyltrimethoxysilane (APTMS) is added, and adsorbed for 30 minutes, and then 15 μL of ammonia is added, and the reaction is continued for 24 hours. After completion of the reaction, the obtained is centrifuged to remove the supernatant, and the solid particles obtained by centrifugation were redispersed in 1 mL of ultrapure water and washed with water for three times. The solid particles obtained by centrifugation are silica@PE3@QDs@Silica fluorescent sub-sphere modified by amino on the surface having a central emission wavelength of 520 nm.

The above described fluorescent sub-spheres can be silica nanospheres, but not limited to silica nanospheres. Polymer nanospheres modified by carboxyl or amino on the surface can also be template nanospheres for assembling quantum dots.

The fluorescent intensity of the above described fluorescent sub-spheres can be achieved by multilayered assembling quantum dots on the surface of the silica particles, that is, on the surface of the prepared Silica@PE3@QDs fluorescent sub-spheres (not coated with silicon), polycationic electrolyte PDADMAC is used to electrostatic assembling, and then another layer of QDs is assembled by the same method as above. Finally, a fluorescent sub-sphere assembled with two layers of QDs particles, namely Silica@PE3@QDs@QDs, is obtained. Similarly, the controllable assembling of multilayers of QDs can be achieved.

Type Three:

Silica nanospheres loaded with fluorescence quantum dots having a central emission wavelength of 600 nm on the surface. The optimal particle size of silica nanospheres is 200 nm, and the surface of the silica nanospheres are modified with functional groups, preferably amino or carboxyl, and the quantum dots assembled on the surface of the silica nanospheres can be CdSe@ZnS nanocrystals with a particle size of 4.7-5.2 nm or other quantum dots crystal emitting fluorescence at the same wavelength. The specific preparation method for sub-spheres of type three is consistent with that of sub-spheres of type two, except that the carboxyl quantum dots assembled on the surface are nanocrystals having a central emission wavelength of 600 nm, and then the central emission wavelength of the finally obtained fluorescent sub-sphere is 600 nm.

Similarly, the fluorescent sub-spheres of type three can be silica nanospheres, but not limited to silica nanospheres. Polymer nanospheres modified by carboxyl or amino on the surface can also be template nanospheres for assembling quantum dots.

Also, the fluorescent intensity of above described fluorescent sub-spheres can be achieved by multilayered assembling quantum dots on the surface of the silica particles, that is, on the surface of the prepared Silica@PE3@QDs fluorescent sub-spheres (not coated with silicon), polycationic electrolyte PDADMAC is used to electrostatically assembling, and then another layer of QDs is assembled by the same method as above. Finally, a fluorescent sub-sphere assembled with two layers of QDs particles, namely Silica@PE3@QDs@QDs, is obtained. Similarly, the controllable assembling of multi-layer QDs can be achieved.

Type Four:

Silica nanospheres of which the sub-sphere is assembled with two kinds of fluorescent quantum dots having a central emission wavelength of 520 nm and 600 nm respectively on the surface. The optimal particle size of silica nanospheres is 200 nm, and the surface of the silica nanospheres are modified with functional groups, preferably amino or carboxyl, and the quantum dots assembled on the surface of the silica nanospheres can be fluorescence quantum dots having a central emission wavelength of 520 nm and 600 nm, and the co-assembling of the two kinds of quantum dots is realized by layer-by-layer assembling. The method of layer-by-layer assembling is the same as that of assembling the second layer of quantum dots on the surface of silica sub-sphere of type two and type three. Similarly, the controllable assembling of multi-layer quantum dots on the surface of the silica sub-sphere can be achieved.

Type Five:

Silica nanospheres covalently doped with fluorescein isothiocyanate (FITC) in the interior and modified with amino on the surface. The particle diameter of the silica nanospheres is preferably 200 nm. The specific preparation method for the fluorescent sub-sphere is as follows:

step one: 5.25 mg of FITC is ultrasonically dissolved in 1 mL of anhydrous ethanol, 73 µL of γ-aminopropyltriethoxysilane (APTES) is added under magnetic stirring at 300 rpm, which are reacted in dark for 12 hours, to obtain FITC-APS solution.

step two: 24.7 mL of anhydrous ethanol, 1.6 mL of ultrapure water and 1.4 mL of 25% ammonia are successively added into a 50 mL flat-bottomed flask, and 50 µL of the FITC-APS solution and 2.0 mL of TEOS are added under magnetic stirring at 500 rpm, which are reacted in dark for 24 hours. After the completion of the reaction, the obtained is centrifuged to remove the supernatant and the precipitate is redispersed in 20 mL of water to give a FITC-CORE dispersion;

step three: 12 mL of 25% ammonia was diluted with 68 mL of ultrapure water to prepare a reaction solution A; 98.72 mL of anhydrous ethanol, 20 mL of the FITC-CORE dispersion obtained in step two, the reaction solution A and 1.28 mL of TEOS are successively added into a 250 mL flask, which are reacted in dark for 2 hours in a 40° C. water bath. After the completion of the reaction, the obtained is centrifuged to remove the supernatant, and the obtained fluorescent particles are washed with ultrapure water for two times, and finally the particles are dispersed in 10 mL of ultrapure water to obtain a dispersion of FITC-Silica fluorescent particle covalently doped with FITC in the interior.

step four: 95 mL of anhydrous ethanol, 150 mg of FITC-Silica fluorescent particles obtained in step three, and 4 mL of 25% ammonia are successively added into a 100 mL flat-bottomed flask, then 1 mL APTES is added magnetic stirring at 500 rpm, which are reacted in dark for 15 hours. After the completion of the reaction, the obtained is centrifuged to remove the supernatant, and the precipitate is centrifugally washed with anhydrous ethanol for two times. Finally, the obtained fluorescent particles are dispersed in 10 mL of anhydrous ethanol, and FITC—Silica nanofluorescent sub-spheres modified by amino on the surface are obtained, and the fluorescence central emission wavelength of the sub-spheres is 515 nm to 525 nm.

By adjusting the amount of FTIC-APS added, the fluorescent sub-spheres having a variety of independent fluorescence intensity are obtained.

Type Six:

Fluorescent sub-spheres loaded with quantum dots in the interior. Fluorescent sub-spheres loaded with QDs in the interior are prepared by referring to Reference [J. Mater. Chem., 2011, 21, 12520]. The specific preparation method is as follows:

CdSe@ZnS quantum dots having a central emission wavelength of 520 nm and coated with TOPO on the surface are selected and dispersed in chloroform to form a 0.8 µM suspension for use. 10 mg of polymer nanospheres having a particle diameter of 200 nm are selected and dispersed in 4 ml of hexadecane, and then 500 µL of the above QDs/chloroform dispersion is added, which is slowly heated to 70 degrees under nitrogen, and reacted for 1 hour while keeping the temperature, and then gradually heated to 180 degrees. The reaction system is suddenly cooled once no reflux phenomenon is observed. After centrifugation, the resulting fluorescent sub-spheres loaded with QDs in the interior are washed with ethanol for three times, and the obtained fluorescent sub-spheres are stored in 1 ml of ethanol for use.

The fluorescence intensity of the above described fluorescent sub-spheres can be adjusted by changing the volume of QDs/chloroform dispersion added. The above preparation method for the sub-spheres of type six is not limited to the method described in [J. Mater. Chem., 2011, 21, 12520], it can be prepared by template method [Langmuir 2006, 22, 5604-5610] etc., or in situ polymerization method. The sub-spheres used can be polymers, or silica sub-spheres.

The above polymeric nanospheres material for preparing sub-spheres can also be one selected from the group consisting of polystyrene, copolymer of polystyrene and polyacrylic acid, and copolymer of polystyrene and polymethacrylic acid. The functional group can also be one selected from the group consisting of hydrosulphonyl and hydroxyl.

Third, the assembly method of sphere and sub-sphere.

Method One:

The surface of the sphere is covalently assembled with one layer of sub-spheres. The sphere may be any one type of the above sphere structural units, and the sub-sphere may also be any one type of the above sub-sphere structural units. A specific covalent assembling method is as follows:

First, 3 mg of any one type of the sphere structural units is selected, and the surface of the sphere is carboxyl functional group. The sphere is washed with 25 mM sodium chloride solution for 2~4 times and then redispersed in 300 μL of 25 mM sodium chloride solution to obtain a sphere dispersion; 8 mg of any one type of the sub-sphere structural units is selected and dispersed in 300 μL of 25 mM sodium chloride solution to obtain a sub-sphere dispersion; the sphere dispersion is added dropwise into the sub-sphere dispersion under ultrasound, and then the obtained is reacted under rotating for 30 minutes on a mixing apparatus; after the completion of the reaction, a reaction solution obtained by dissolving 10 mg in each of EDC/NHS in a 25 mM sodium chloride solution is added into the reaction system, which is reacted under rotating for another 3 hours on the mixing apparatus; after the completion of the reaction, the obtained is centrifuged to remove the remained sub-spheres which are not assembled to the surface of the sphere, and the obtained is successively washed with water, 1:1 acetic acid and anhydrous ethanol for two times respectively, finally the encoded microspheres are obtained and dispersed in 500 μL of anhydrous ethanol for use.

Method Two:

The surface of the sphere is covalently assembled with two types of sub-spheres. The sphere may be any one type of the above sphere structural units, and the sub-sphere may also be any two types of the s above sub-sphere structural units. The specific covalently assembling method is the same as that described in method one, except that the ratio of the two types of sub-spheres can be adjusted according to the encoding requirements of emission spectrum (the central emission wavelength) and fluorescence intensity.

Fourth, combining examples of the spheres and the sub-spheres:

Example 1

Preparation of a sphere encoded fluorescent microsphere. The spheres of type four modified by amino on the surface, namely polymeric mesoporous microspheres loaded with two kinds of quantum dots having a central emission wavelength of 520 nm and 600 nm respectively in the interior, were selected. The sub-spheres of type one, namely non-fluorescent silica or polymer microspheres modified by carboxyl on the surface were selected. The sphere and the sub-sphere were covalently assembled by assembling method one to obtain a encoded fluorescent assembled microsphere having carboxyl on the surface.

By this combination, adjusting the loaded amounts of the two quantum dots in the sphere of type four to make that the loading amount of each quantum dot can achieve five kinds of independent fluorescence intensity respectively, and eventually the preparation of 25 kinds of fluorescent encoded microspheres could be realized.

Example 2

Preparation of microspheres co-encoded by green fluorescent spheres and orange fluorescent sub-spheres. The spheres of type two modified by amino on the surface were selected, and the sub-spheres of type three modified by carboxyl on the surface were selected. The spheres and the sub-spheres were covalently assembled by assembling method one to obtain a co-encoded fluorescent assembled microsphere having carboxyl on the surface.

By this combination, adjusting the loaded amounts of the fluorescent quantum dots in the spheres of type two to achieve 2~10 kinds of independent fluorescence intensity; adjusting the number of assembling layers of the fluorescent sub-spheres of type three to achieve 1~3 kinds of independent fluorescence intensity; and finally the preparation of 30 kinds of fluorescent encoded microspheres could be realized at the most.

Figure 2:
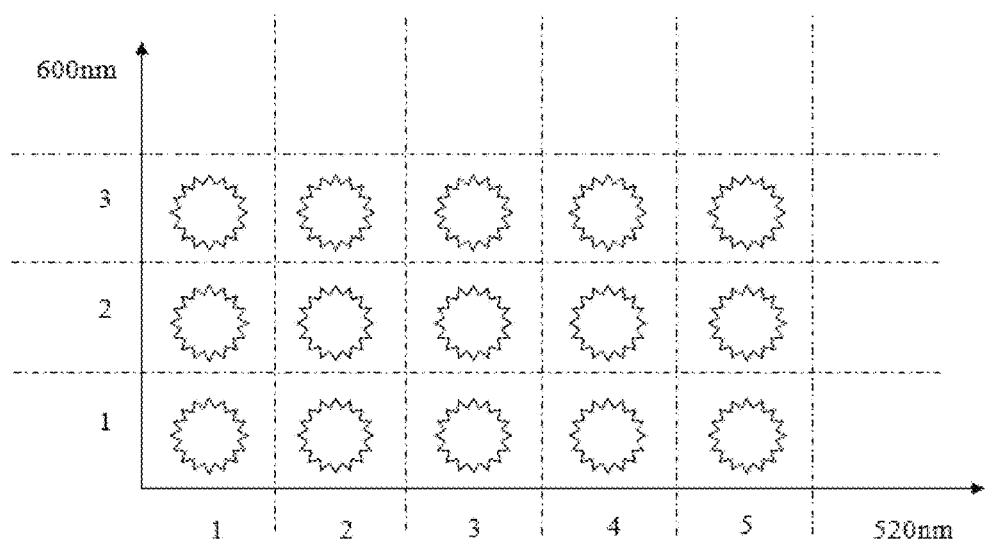
FIG. 2 is a schematic diagram of an encoding combination of the present invention in a two-color fluorescence path.

As shown in FIG. 2, it is distribution diagram of 15 kinds of fluorescent encoding microspheres in the two-color fluorescent channel, wherein the horizontal axis and the vertical axis, respectively, means the fluorescence signal at 520 nm and 600 nm, the fluorescence intensity increases along with the arrow direction. The numbers 1~5 on the horizontal axis and the numbers 1~3 on the vertical axis represent 5 kinds of independent fluorescence intensities of the quantum dots of 520 nm and 600 nm respectively which were achieved by the gradient setting of the loading amounts, thereby forming spheres of 5 kinds of fluorescence intensity and sub-spheres of 3 kinds of fluorescence intensity, and then 15 kinds of fluorescent encoding microspheres were formed by cross-combination. The fluorescent signal distribution intervals of each kind of fluorescent encoding microspheres were shown in a total of 15 closed curves in FIG. 2.

Example 3

Preparation of microspheres co-encoded by orange fluorescent spheres and green fluorescent sub-spheres. The spheres of type three modified by carboxyl on the surface were selected, and the of sub-spheres of type two or six modified by amino on the surface were selected. The sphere and the sub-sphere were covalently assembled by assembling method one to obtain co-encoded fluorescent assembled microsphere having amino on the surface.

By this combination, adjusting the loaded amounts of the fluorescent quantum dots in the sphere of type three to achieve 2~10 kinds of independent fluorescence intensity; adjusting the number of assembling layers of the fluorescent sub-spheres of type two to achieve 1~3 kinds of independent fluorescence intensity; and finally the preparation of 30 kinds of fluorescent encoded microspheres could be realized at the most.

Example 4

Preparation of microspheres co-encoded by non-fluorescent spheres and green fluorescence sub-spheres. The spheres of type one modified by amino on the surface were selected, and the fluorescent sub-spheres of type two and one modified by carboxyl on the surface were selected. The spheres and the sub-spheres were covalently assembled by assembling method two to obtain co-encoded fluorescent assembled microsphere having carboxyl on the surface.

By this combination, adjusting the number of assembling layers of quantum dots on the surface of the fluorescent sub-spheres of type two and the ratio of the fluorescent sub-spheres of type two to the silica sub-spheres of type one to realize the preparation of 10 kinds of fluorescent encoded microspheres.

Example 5

Preparation of microspheres co-encoded by non-fluorescent spheres and orange fluorescence sub-spheres. The spheres of type one modified by amino on the surface were selected, and the fluorescent sub-spheres of type three and one modified by carboxyl on the surface were selected. The spheres and the sub-spheres were covalently assembled by assembling method two to obtain co-encoded fluorescent assembled microsphere having carboxyl on the surface.

By this combination, adjusting the number of assembled layers of quantum dots on the surface of the fluorescent sub-spheres of type three and the ratio of the fluorescent sub-spheres of type three to the silica sub-spheres of type one to realize the preparation of 10 kinds of fluorescent encoded microspheres.

Example 6

Preparation of microspheres co-encoded by non-fluorescent spheres and green fluorescence sub-spheres. The spheres of type three modified by amino on the surface were selected, and the fluorescent sub-spheres of type five and one modified by carboxyl on the surface were selected. The spheres and the sub-spheres were covalently assembled by assembling method two to obtain co-encoded fluorescent assembled microsphere having carboxyl on the surface.

By this combination, adjusting the number of assembled layers of quantum dots on the surface of the fluorescent sub-spheres of type five and the ratio of the fluorescent sub-spheres of type five to the silica sub-spheres of type one to realize the preparation of 6 kinds of fluorescent encoded microspheres.

Example 7

Preparation of microspheres co-encoded by non-fluorescent spheres and green/orange dual fluorescent sub-spheres. The spheres of type one modified by amino on the surface were selected, and the sub-spheres of type four modified by carboxyl on the surface were selected. The spheres and the sub-spheres were covalently assembled by assembling method one to obtain co-encoded fluorescent assembled microsphere having carboxyl on the surface.

By this combination, using fluorescent sub-spheres having different fluorescence intensity matching to realize the preparation of 4 kinds of encoded microspheres.

The co-assembling encoding method for the sphere and the sub-sphere of the present invention is not limited to those listed in above examples, and can be combined freely according to the encoding requirements.

Example 8

Microspheres co-encoded by three-color fluorescent spheres and sub-spheres. In order to improve encoding ability, quantum dots having a third fluorescence emission spectrum (such as CdSe@ZnS having a central emission wavelength of 670 nm) could also be loaded in the interior of the non-fluorescent spheres, and by adjusting the content of loaded quantum dots, the preparation of the spheres of type two having 2~10 kinds of independent fluorescence intensity can be firstly achieved. And then, it could be co-encoded with the fluorescence sub-spheres emitting green and orange by using the method described in examples 2, 3 and 6 respectively to obtain 60 kinds of encoded microspheres; or it could also be co-encoded with the non-fluorescent sub-spheres of type one to give 10 kinds of encoded microspheres; or it could be co-encoded with the fluorescence sub-spheres emitting green and orange by using the method described in example 7 to obtain 40 kinds of encoded microspheres. Summing up, 110 kinds of independent encoded microspheres could be obtained.

Similarly, the assembled microspheres could be further encoded using more than two kinds of quantum dots having different central emission wavelengths by the above-described method.

The preferred embodiments of the present invention are described above in detail. It should be understood that those of ordinary art can make many modifications and variations according to the concepts of the present invention without any creative work. Therefore, the technical solutions which can be obtained by those skilled in the art under this concept on the basis of the prior art through logical analysis, inference or limited experiment, should be within the protecting scope defined by the claims.

What is claimed:

1. A carrier particle, wherein the carrier particle comprises a sphere and a sub-sphere located on the surface of the sphere; the sphere and/or at least one sub-sphere comprises at least one type of quantum dots;

wherein the sub-sphere comprises a nanosphere, and the quantum dots are loaded on the surface or in the interior of the nanosphere; or wherein the sphere comprises a microsphere, and the quantum dots are loaded in the interior or on the surface of the microsphere.

2. The carrier particle of claim 1, wherein the type of quantum dots in the sphere is different from that in the sub-sphere.

3. The carrier particle of claim 1, wherein the surface of the sphere is coated with the sub-sphere.

4. The carrier particle of claim 1, wherein the surface of both the sphere and the sub-sphere are modified by functional groups, and connection between the sphere and the sub-sphere is achieved by chemical covalent reactions between the functional groups.

5. The carrier particle of claim 1, wherein type of the quantum dots is defined according to a central wavelength of fluorescence emission spectrum of the quantum dots.

6. The carrier particle of claim 1, wherein the quantum dot is any one of nanoparticles consisted of elements of group II-VI or group III-V.

7. The carrier particle of claim 1, wherein the sphere and/or the sub-sphere comprise magnetic nanoparticles.

8. The carrier particle of claim 1, wherein at least one sub-sphere comprises organic fluorescent dye.

9. A method for preparing a carrier particle, wherein at least one nanosphere is linked to a microsphere, and the microsphere and/or the nanosphere is loaded with at least one type of quantum dots.

10. The method of claim 9, wherein the method comprises the following steps:
    (1) loading quantum dots onto the microsphere, thus forming a fluorescent microsphere; and/or
    (2) loading quantum dots onto the nanosphere, thus forming a fluorescent nanosphere; and
    (3) connecting the fluorescent microsphere with the fluorescent nanosphere, or connecting the microsphere with the fluorescent nanosphere, or connecting the fluorescent microsphere with the nanosphere, thus forming the carrier particle;
    wherein step (1) and step (2) are in no particular order when both steps are performed.

11. The method of claim 10, wherein the fluorescent microsphere and the fluorescent nanosphere comprise at least one type of the quantum dots respectively, and various types of fluorescent microspheres and fluorescent nanospheres are defined according to types of the quantum dots respectively.

12. The method of claim 11, wherein the fluorescent microsphere and the fluorescent nanosphere with various fluorescence levels are defined according to number of quantum dots loading onto the same type of fluorescent microspheres and fluorescent nanospheres respectively.

13. The method of claim 10, wherein a method of the connecting in step (3) is that the connecting is achieved through the chemical covalent reaction between functional groups which are respectively linked on the surfaces of the microspheres, the fluorescent microspheres, the nanospheres and the fluorescent nanospheres.

14. The method of claim 9, wherein loading position of the quantum dots is on the surface or in the interior of the microsphere.

15. The method of claim 9, wherein loading position of the quantum dots is on the surface or in the interior of the nanosphere.

16. The method of claim 9, wherein the microsphere and the nanosphere are made of polymer or silica.

17. The method of claim 9, wherein the microsphere and the nanosphere are a spherical structure with a particle diameter of 0.5~20 μm and 30~500 nm respectively.

18. The method of claim 9, wherein type of the quantum dots is defined according to a central wavelength of fluorescence emission spectrum of the quantum dots.

19. The method of claim 9, wherein the microsphere and/or the nanosphere comprise a magnetic nanoparticle.

20. The method of claim 9, wherein at least one nanosphere is loaded with organic fluorescent dye.

\* \* \* \* \*